Oct. 22, 1946.  O. A. KEHLE  2,409,765
HYDRAULIC SELECTOR VALVE
Filed May 4, 1943  2 Sheets-Sheet 1
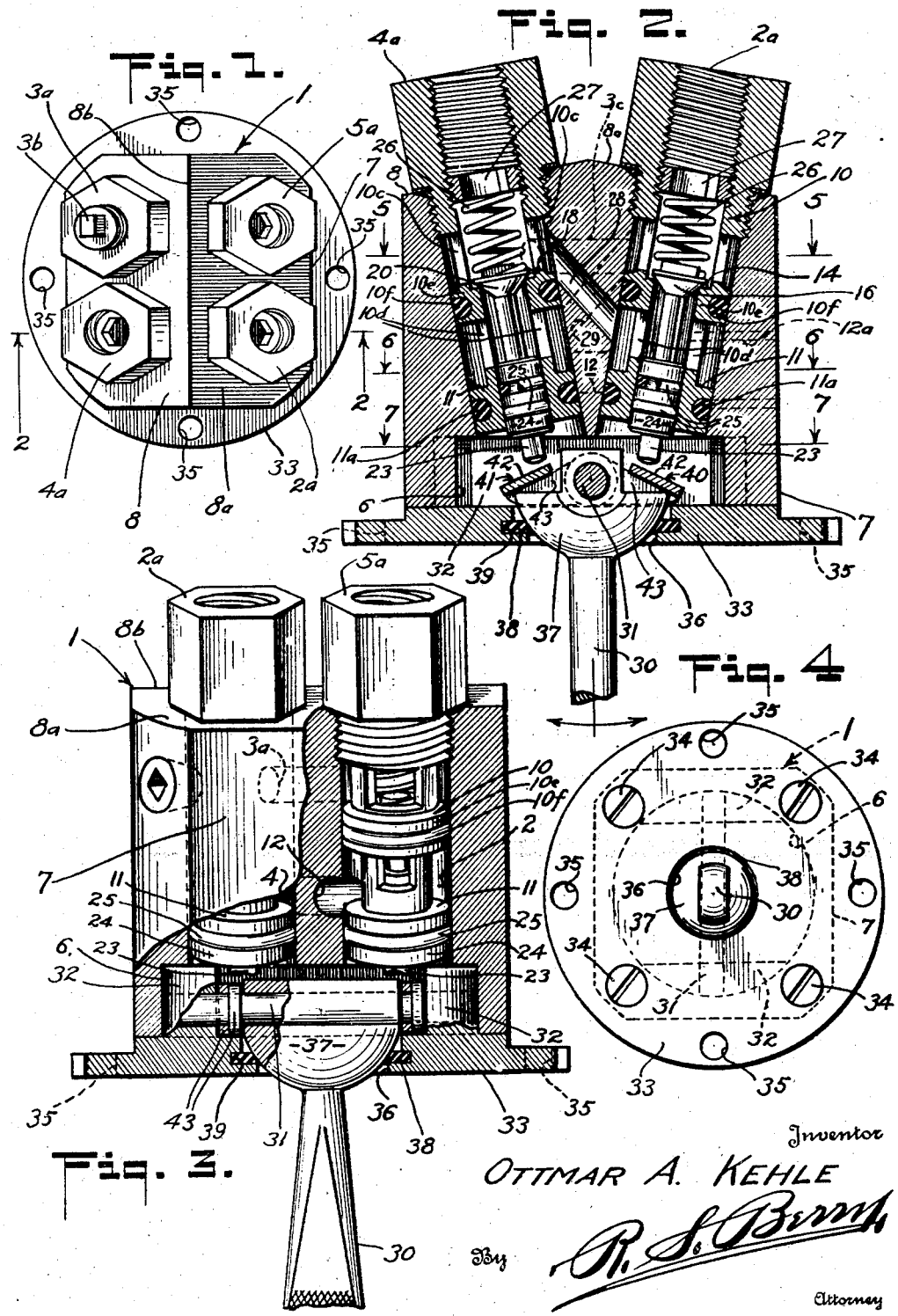
Inventor
OTTMAR A. KEHLE Oct. 22, 1946.  O. A. KEHLE  2,409,765
HYDRAULIC SELECTOR VALVE
Filed May 4, 1943  2 Sheets-Sheet 2
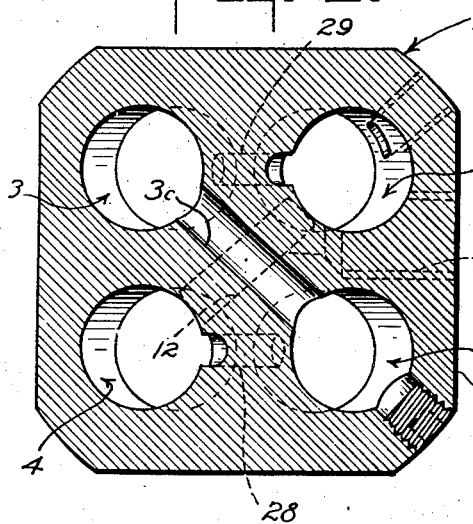
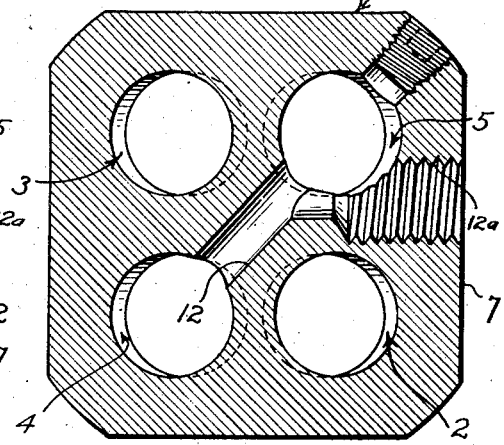
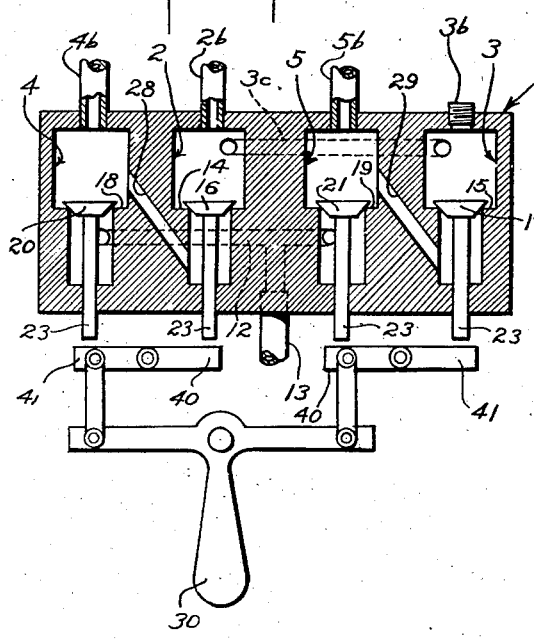
Inventor
OTTMAR A. KEHLE
By R. S. Berry
Attorney Patented Oct. 22, 1946

2,409,765

UNITED STATES PATENT OFFICE 2,409,765

HYDRAULIC SELECTOR VALVE

Ottmar A. Kehle, West Los Angeles, Calif., assignor to Adel Precision Products Corp., a corporation of California Application May 4, 1943, Serial No. 485,674

1 Claim. (Cl. 137—144)

This invention relates to a hydraulic selector valve for controlling a hydraulic cylinder or like means for operating aircraft controls and component mechanisms.

One of the objects of my invention is to provide a control valve such as above described in which bores, ports and passages are constructed and arranged in a novel manner making possible the use of a comparatively small, compact and light-weight valve body as well as cartridge type valve assemblies of such improved construction and arrangement as will permit of ready and easy installation, removal inspection and parts replacement operations and make for a reliable performance of the control valve.

Another object is to provide a selector valve unit of the character described in which a simply constructed and highly efficient valve operating means, when released following an operation to unseat selected valve members of the unit, will permit the unseated valve members to seat so as to return the operating means to a neutral position.

A further object of my invention is to provide a selector valve of the character described which includes four poppet valves arranged in a rectangular group in small compass in a small valve body and intercommunicated by mean of straight ports and passages of short extent and so related to one another, the body and the valves as to make it possible to use a simple and efficient valve operating means likewise of small compass and including a lever movable in opposite directions to open and hold open selected pairs of the valves and which when released is returned to neutral position and allows the valves to seat.

With the foregoing objects in view, together with such other objects and advantages as may subsequently appear, the invention resides in the parts and in the combination, construction and arrangement of parts hereinafter described and claimed, and illustrated by way of example in the accompanying drawings, in which:

Fig. 1 is a top plan view of a valve embodying my invention;

Fig. 2 is an enlarged vertical sectional view taken on the line 2—2 of Fig. 1;

Fig. 3 is in part a side elevation looking from left to right in Figs. 1 and 2, parts being shown in section;

Fig. 4 is a bottom plan view of the valve shown in Fig. 1;

Fig. 5 is a horizontal sectional view taken on the line 5—5 of Fig. 2 with the valve assemblies and valve operating means omitted for clarity of illustration of the bores, ports and passages in the valve body;

Fig. 6 is a horizontal sectional view taken on the line 6—6 of Fig. 2 with the valve assemblies and valve operating means omitted for clarity of illustration of the bores, ports and passages in the valve body;

Fig. 7 is a horizontal sectional view taken on the line 7—7 of Fig. 2;

Fig. 8 is a diagrammatic view of the valve embodying my invention.

Referring to the accompanying drawings more specifically, it is seen that one embodiment of my invention includes a valve body 1 of substantially rectangular form provided with bores extending longitudinally therethrough, there being a pair of pressure fluid receiving bores 2 and 3 and a pair of bores 4 and 5 for passing fluid to and receiving fluid from a hydraulic cylinder, not shown. The pressure bores 2 and 3 are located adjacent diagonally opposite corners of the body 1 while the cylinder bores 4 and 5 are located in the same relation to the other diagonally opposite corners of said body thereby providing a rectangular group of bores in which a pressure and a cylinder bore are aligned as a pair on one side of the longitudinal axis of the valve body while the other bores are similarly disposed on the other side of said axis for convenience of selective operation and other purposes as will be apparent hereinafter.

The body 1 is provided at one end thereof with a chamber 6 coextensive with and common to said bores and adapted to contain valve operating means which will be hereinafter described.

The pressure bore 2 and the cylinder bore 5 aligned therewith in a plane substantially parallel to the side surface 7 of the valve body 1 are extended obliquely inwardly from the inclined upper surfaces 8 and 8a of the body. The other bores 4 and 3 are correspondingly disposed and therefore converge with bores 2 and 5 so that the lower or inner ends of the bores are more closely grouped than at their upper or outer ends. This arrangement conserves space and bulk and makes possible adequate spacing of the outer ends of the bores for accommodating line connections, while the closely grouped lower ends opening into the chamber 6 make for the desired operation of valves in said bores with a novel mechanism of simple, small and compact construction and which will be hereinafter described in detail. The accommodation of the fluid line connections at the upper ends of the bores is enhanced by the beveled or inclined surfaces 8 and 8a which slope in opposite direction from a center ridge 8b and extend substantially at right angles to the major axes of the bores, as shown in Fig. 2. Moreover, the particular arrangement of the bores as here provided simplifies the formation of a novel arrangement of ports and passages which constitute improvements in the art as will be hereinafter apparent.

As here provided the pressure bore 2 is provided with a connection fitting 2a at its outer or upper end affording the coupling thereto of a fluid pressure supply line such as the 2b shown in Fig. 8 whereby fluid from a pump or other source of supply of pressure fluid (not shown) may be delivered to the control valve. Owing to the fact that the outer end of each pair of bores (3 and 5 or 4 and 2) are farther spaced apart than their juxtaposed inner ends, a space circumjacent to the outer end of each bore is provided against which the enlarged part of the screwed in fitting may abut.

Similar connection fittings 4a and 5a are provided for the cylinder bores 4 and 5 whereby cylinder lines such as the ones 4b and 5b in Fig. 8 for directing fluid to and from a hydraulic cylinder (not shown) are provided.

The outer end of the other pressure bore 3 is provided with a similar fitting 3a and is closed by means of a plug 3b screwed into said fitting. However, pressure fluid is delivered from the pressure bore 2 to the pressure bore 3 by means of a short and straight pressure port 3c extending horizontally in the upper or outer part of the body 1 as shown in dotted lines in Figs. 2 and 3 and in full lines in Fig. 5.

As here provided the fittings 2a, 3a, 4a and 5a are provided as the integral outer ends of four cylindrical valve containing cartridges or cages generally designated 10 and which extend into the bores 2, 3, 4, and 6 through the length of the latter. The inner or lower ends 11 of the cages 10 are constructed to act as closures for the corresponding ends of the bores 2, 3, 4 and 5 and each of the ends 11 is provided with a peripheral sealing ring 11a of circular cross section to engage the walls of said bores.

As shown in Figs. 2 and 3 in dotted lines and in Fig. 6 in full lines, the body is provided with a short and straight return fluid passage 12 extending horizontally between the two cylinder ports in a plane parallel to that of the pressure port 3c and spaced from the inner ends of the bores about the same distance as the port 3c is spaced from the outer ends of the bores. An internally screw threaded outlet port 12a is extended through the side surface 7 of the body 1 so as to intersect the passage 12 and the cylinder bore 5 as best shown in Fig. 6. This outlet port affords the connection of a return line such as the one 13 shown in Fig. 8, whereby fluid is returned to the reservoir (not shown) of the hydraulic system with which my valve unit is associated.

Located at corresponding points in the cages 10 in the pressure bores 2 and 3 are valve seats 14 and 15 for pressure valves 16 and 17 of the poppet type which are operated to open and close the bores 2 and 3 at points between the closed ends 11 of the cages and the points where the pressure port 3c opens into the upper ends of said bores.

Similarly disposed in the cages 10 in the cylinder bores 4 and 5 are valves 20 and 21 of the poppet type arranged to open and close the bores 4 and 5 at points between the connection fitting 4a and 5a and the points where the return passage 12 open into said bores.

Each of the cages 10 has a reduced portion between the valve seat therein and the connection fitting on the outer end thereof, also a second reduced portion between the valve seat and the enlarged or closure end 11 thereof. These reduced portions are provided with large radial ports 10c and 10d respectively which communicate the associated bore with the interior of the cage. A portion 10e of each cage surrounds the valve seat and has a sealing fit in its associated bore and is provided with a sealing ring 10f of circular cross section in sealing contact with the wall of said associated bore.

Each of the valves here employed is identical and has a stem 23 provided with an enlarged piston-like guide portion and closure member 24 having a working fit in the lower end 11 of its associated cage. Packing rings 25 are provided on the guide portion 24 and together with said portion will seal the lower or inner end of the bore through cage and shut off communication between the associated bore in the valve body and the chamber 6. The lower end of each valve stem 23 is disposed in the chamber 6 as shown in Fig. 2. By constructing each member 24 as a part of the valve stem with which it is associated a fewer number of separate parts are required than would otherwise be necessary.

A spring 26 is provided in each cage for seating each valve and has a tension adjusting nut 27 associated therewith as shown in Fig. 2. It is now seen that the four valve assemblies are complete in their respective cages which are subject to being readily screwed into and unscrewed and removed from the bores 2, 3, 4 and 5 thereby facilitating assembly of the unit hereof as well as inspection and parts-replacement operations.

In accordance with my invention the body 1 is provided with communicating or connecting passages 28 and 29 which extend from those portions of the pressure bores 2 and 3 which are between the sealing ends 11 of the cages 10 and the pressure valve seats 14 and 15 obliquely upwardly and outwardly into those portions of the cylinder bores 4 and 5 which are between the return valve seats 18 and 19 and the connection fittings 4a and 5a. Looking at Fig. 2 it is seen that since bore 2 is opposite and on the right side of bore 4, the connecting passage 28 extends upwardly from bore 2 and is inclined to the left, while passage 29 extends as shown in dotted lines upwardly from bore 3 and is inclined in the opposite direction compared to passage 28, thereby making it possible to form these passages with a simple drilling operation.

I provide in accordance with this invention a novel means for selectively operating the valves in pairs, this means being of simple construction and arrangement, comparatively inexpensive in that it requires no costly machining operations in the making thereof and is exceptionally compact. As here shown this means includes an operating lever 30 fulcrumed at one end on a pin 31 seated in apertured ears 32 formed on a closure plate 33. This plate is secured by means of fastenings 34 to the end of the body at which the chamber 6 opens and not only closes said chamber but acts as a mounting means for the valve unit inasmuch as it is provided with bolt openings 35 in marginal portions which extend outwardly from the valve body as seen in Figs. 1 and 2.

The plate 33 has a circular opening 36 therein through which the lever 30 extends, it being noted that the ears 32 and the pin 31 are disposed in the chamber 6 and that said ears have curved outer faces 32a which engage and conform to the circular side wall of the chamber 6 as shown in Fig. 7. Spaced somewhat outwardly from the fulcrum point of the lever 30 is a substantially semi-spherical enlargement 37 the curved surface of which is outermost and projects through the opening 36 so as to contact a flexible sealing annulus 38 held in a recess 39 in the wall of said opening and operating to seal said opening yet permit of free oscillatory movement of the lever.

U-shaped valve stem lifting members 40 and 41 are mounted on the lever 30 on opposite sides of the fulcrum so that on movement of the lever to the right the member 40 will simultaneously engage and lift stems 23 for the pressure valve 16 and the return valve 21 in bores 2 and 5 respectively whereas when the lever is moved to the left the member 41 will simultaneously engage the stems 23 for the pressure valve 17 and to return valve 20 in the bores 3 and 4 respectively.

The lifting members 40 and 41 each have plate-like bodies 42 which rest in inclined planes on the upper edges of the enlargement 37 as shown in Fig. 2, slightly spaced from the valve stem 23 when valves and operating means therefor are in neutral position. The members 40 and 41 have side arms 43 as shown in Figs. 3 and 7, said arms being flattened and overlapped where the pin passes through their alined apertures.

With reference to the diagrammatic view of the valve shown in Fig. 8, it is seen that the lever 30 is normally in a neutral perpendicular position and all valve members are closed. When it is desired to operate the cylinder (not shown) in one direction the lever is swung to the right so that the valve lifting member 40 will be moved against the stems 23 of the pressure valve 16 and return valve 21 in the bores 2 and 5 respectively, thereby simultaneously unseating the valves 16 and 21.

Pressure fluid now flows through bore 2 in which the valve 16 is open, passage 28, bore 4 above the valve 20, then closed, thence through cylinder line 4b to one end of the cylinder. Return fluid from the other end of the cylinder passes through the other cylinder line 5b into the bore 5, past valve 21, then opens into return passage 12, thence through port 12a into the return line 13 of the hydraulic system.

The valves 16 and 21 will remain unseated as long as the operator holds the lever 30 in the position into which it is moved to unseat said valves but when the lever is released, the fluid pressure and the springs for said valves will seat the valves and the stems 23 will operate to return the lever to neutral position during the seating movement of the valves.

When it is desired to move the hydraulic cylinder piston (not shown) in the opposite direction to that effected responsive to movement of lever 30 to the right, the lever is swung to the left so that the valve lifting member 41 will engage the stems 23 for the valves 17 and 20 in the bores 3 and 4 respectively whereby said valves will be simultaneously unseated. Pressure fluid now flows from bore 2 through the port 3c into the bore 3, thence past open valve 17, through passage 29, upper part of bore 5 and cylinder line 5b to the cylinder (not shown). Fluid is returned from the cylinder through the line 4b bore 4, past then open valve 20 to the return passage 12 and return port 12a into the return line 13.

When the lever 30 is released the valves 17 and 20 will operate to return the lever to neutral position while being seated by fluid and spring pressure in the same manner as with the valves 16 and 21 hereinbefore described.

It should be noted that the valves 15, 16, 20 and 21 are closed and the lever 30 returned to neutral by fluid pressure more particularly than by the springs 26, due to the pressure of the fluid against the piston-like ends 24 of the stems 23 of said valves. These piston-like ends in responding to fluid pressure so as to transmit this pressure to the operating lever 30, give to the operator a certain "feel" indicative of the condition of the system, thereby affording a nicety of control. In other words, if there is no load on the hydraulic cylinder controlled by my valve unit, until the piston in the cylinder reaches the end of its stroke, the pressure will build up and the force thereof will be transmitted to the operating lever 30 thereby indicating to the operator that he should release the operating lever whereby the pressure fluid will close the valves and return the handle to neutral.

The amount of flow through the valve unit hereof is easily regulated. Tapping of the lever 30 results in infinitesimal flow and small movement of said lever causes a like small flow, while full movement of the lever effects a full flow of the fluid, there being a definite "feel" transmitted as aforesaid to the operator, thereby affording a greater nicety of control.

While I have shown and described specific embodiments of my invention I do not limit myself to the exact details of construction set forth, and the invention embraces such changes, modifications and equivalents of the parts and their formation and arrangement as come within the purview of the appended claim.

I claim:

In a structure of the kind described, a support, a valve operating lever, a pivot connecting an end portion of said lever with said support for rocking movement in relation thereto, said end portion of said lever having a head which provides two oppositely projecting extensions, one at each side of said pivot, a pair of flattened side arms at each side of said pivot having aligned apertures through which said pivot passes, an elongated valve operating plate secured to edge portions of each of said pairs of flattened arms, said valve operating plates being positioned at opposite sides of said pivot in a parallel spaced apart relation to each other, and positioned to be supported by the aforesaid extensions of the lever head, a valve body mounted on the aforesaid support, and a plurality of valves mounted in said body, said valves having operating stems a plurality of which are positioned for being acted upon in an endwise manner by a face portion of each of said plates when said lever is rocked.

OTTMAR A. KEHLE.